(12) United States Patent
Kasperkiewicz et al.

(10) Patent No.: US 7,945,848 B2
(45) Date of Patent: May 17, 2011

(54) DYNAMICALLY MODIFYING A THEME-BASED MEDIA PRESENTATION

(75) Inventors: Tomasz S. M. Kasperkiewicz, Redmond, WA (US); Benjamin R. Peart, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1026 days.

(21) Appl. No.: 11/471,760

(22) Filed: Jun. 21, 2006

(65) Prior Publication Data

US 2007/0300158 A1 Dec. 27, 2007

(51) Int. Cl.
*G06F 3/00* (2006.01)
*G06F 17/30* (2006.01)

(52) U.S. Cl. ........ 715/205; 715/234; 715/255; 715/731; 707/E17.009; 707/913; 707/951

(58) Field of Classification Search .......... 715/200–205, 715/207, 209, 210, 226, 229, 231, 232, 234, 715/240, 243, 253, 255, 256, 273, 274, 277, 715/700, 719, 727, 728, 730, 731, 746, 747, 715/760, 762, 765, 788; 707/914, 915, 916, 707/917, 920, 951, E17.009, E17.031, E17.102
See application file for complete search history.

(56) References Cited

U.S. PATENT DOCUMENTS

| 6,081,262 | A | * | 6/2000 | Gill et al. .................. 715/202 |
| 6,088,026 | A | * | 7/2000 | Williams ................... 715/202 |
| 6,128,629 | A | * | 10/2000 | Bretschneider et al. ........... 1/1 |
| 6,636,888 | B1 | * | 10/2003 | Bookspan et al. ............ 709/203 |
| 6,976,028 | B2 | * | 12/2005 | Fenton et al. ............... 707/102 |
| 7,090,253 | B2 | * | 8/2006 | Phillips et al. ................ 283/2 |
| 7,278,091 | B2 | * | 10/2007 | Kramer et al. .............. 715/201 |
| 7,533,348 | B2 | * | 5/2009 | D'Hers et al. ............... 715/764 |
| 2002/0131565 | A1 | * | 9/2002 | Scheuring et al. ......... 379/88.19 |
| 2004/0017390 | A1 | * | 1/2004 | Knowlton et al. ........... 345/731 |
| 2004/0034869 | A1 | * | 2/2004 | Wallace et al. ............... 725/45 |
| 2004/0091232 | A1 | * | 5/2004 | Appling, III ................ 386/46 |
| 2004/0122915 | A1 | * | 6/2004 | Saare et al. ................ 709/218 |
| 2004/0133597 | A1 | * | 7/2004 | Fano et al. ............... 707/104.1 |
| 2006/0010155 | A1 | * | 1/2006 | D'Hers et al. .............. 707/102 |
| 2006/0224988 | A1 | * | 10/2006 | Bedingfield ................ 715/774 |
| 2006/0253874 | A1 | * | 11/2006 | Stark et al. .................. 725/62 |
| 2006/0282272 | A1 | * | 12/2006 | Urasaki et al. ................. 705/1 |
| 2007/0220045 | A1 | * | 9/2007 | Morris et al. ............. 707/104.1 |

FOREIGN PATENT DOCUMENTS

EP 0953925 * 11/1999

* cited by examiner

*Primary Examiner* — Maikhanh Nguyen

(57) ABSTRACT

A system and method for dynamically modifying a media presentation is disclosed. A first presentation theme associated with a media presentation is determined. A plurality of multi-media data files are accessed, wherein each of the plurality of multi-media data files comprises associated metadata. A first of the plurality of multi-media data files are associated with the first presentation theme based on the associated metadata and the first of the plurality of multi-media data files is presented.

20 Claims, 5 Drawing Sheets

400

Determining a first presentation theme associated with a media presentation.
402

Accessing a plurality of multi-media data files wherein each of the plurality of multi-media data files comprises an associated meta data tag.
404

Associating a first of the plurality of multi-media data files with the first presentation theme based on the associated meta data tag.
406

Presenting the first of said plurality of multi-media data files.
408

```
┌─────────────────────────────────────────┐
│ Determining a first presentation theme  │
│      associated with a media            │
│             presentation.               │
│                 502                     │
└─────────────────────────────────────────┘
                    │
                    ▼
┌─────────────────────────────────────────┐
│ Dynamically modifying the first         │
│ presentation theme to a second          │
│         presentation theme.             │
│                 504                     │
└─────────────────────────────────────────┘
                    │
                    ▼
┌─────────────────────────────────────────┐
│  Accessing a plurality of multi-media   │
│  data files wherein each of the         │
│  plurality of multi-media data files    │
│  comprises an associated meta data tag. │
│                 506                     │
└─────────────────────────────────────────┘
                    │
                    ▼
┌─────────────────────────────────────────┐
│ Associating a first of the plurality of │
│ multi-media data files with the second  │
│ presentation theme based on the         │
│       associated meta data tag.         │
│                 508                     │
└─────────────────────────────────────────┘
                    │
                    ▼
┌─────────────────────────────────────────┐
│ Presenting the first of the plurality   │
│         of multi-media data files.      │
│                 510                     │
└─────────────────────────────────────────┘
```

FIG. 5

DYNAMICALLY MODIFYING A THEME-BASED MEDIA PRESENTATION

BACKGROUND

People accumulate large collections of digitized personal memories (e.g., pictures, video, audio etc.) through a combination of digital photography and digitization of legacy photographs/videos. Currently, a basic thumbnail browser presents the user with a chronological ordering of the collection with a small amount of hierarchical structure, based on when the photos were uploaded and/or scanned in. Newer algorithms use time information provided by the camera to create a true time-based hierarchical structure. It is generally accepted that collections would be easier to use, and more valuable to the users, if the photos were also organized and/or annotated in a way that reflected their content.

One problem is that users are not able to view or present photos in an organized way. For example, if a person wanted to show someone all of their travel pictures, they would have to manually go through and select the travel pictures from the collection, which could be very large. This process can be very time consuming and makes it difficult to enjoy the memories in a personalized way without much user work.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system and method for dynamically modifying a media presentation is disclosed. A first presentation theme associated with a media presentation is determined. A plurality of multi-media data files are accessed, wherein each of the plurality of multi-media data files comprises associated metadata. A first of the plurality of multi-media data files are associated with the first presentation theme based on the associated metadata and the first of the plurality of multi-media data files is presented. In one embodiment, multi-media data files are chosen based on a query against metadata associated with the files. For example, a query may include time, location, temperature, color, etc.

DESCRIPTION OF THE DRAWINGS

The accompanying drawings, which are incorporated in and form a part of this specification, illustrate embodiments of the technology for dynamically modifying a theme-based media presentation and, together with the description, serve to explain principles discussed below:

FIG. 4 is a flow diagram of an exemplary computer implemented method including presenting media associated with a theme in accordance with the present technology for dynamically adjusting a multi-media presentation.

FIG. 5 is a data flow diagram of an exemplary computer implemented method including dynamically modifying a theme in accordance with the present technology for dynamically adjusting a multi-media presentation.

The drawings referred to in this description should be understood as not being drawn to scale except if specifically noted.

DETAILED DESCRIPTION

Reference will now be made in detail to embodiments of the present technology for dynamically modifying a theme-based media presentation, examples of which are illustrated in the accompanying drawings. While the technology for dynamically modifying a theme-based media presentation will be described in conjunction with various embodiments, it will be understood that they are not intended to limit the present technology for dynamically modifying a theme-based media presentation to these embodiments. On the contrary, the presented technology for dynamically modifying a theme-based media presentation is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for dynamically modifying a theme-based media presentation. However, the present technology for dynamically modifying a theme-based media presentation may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "performing", "generating", "displaying", "selecting", "accessing", "determining", "presenting", "tagging", "identifying", "associating", "prompting", "filtering", "providing", and "refreshing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for dynamically modifying a theme-based media presentation is also well suited to the use of other computer systems such as, for example, optical and mechanical computers. Additionally, it should be understood that in embodiments of the present technology for dynamically modifying a theme-based media presentation, one or more of the steps can be performed manually.

Example Computer System Environment

Figure 1:
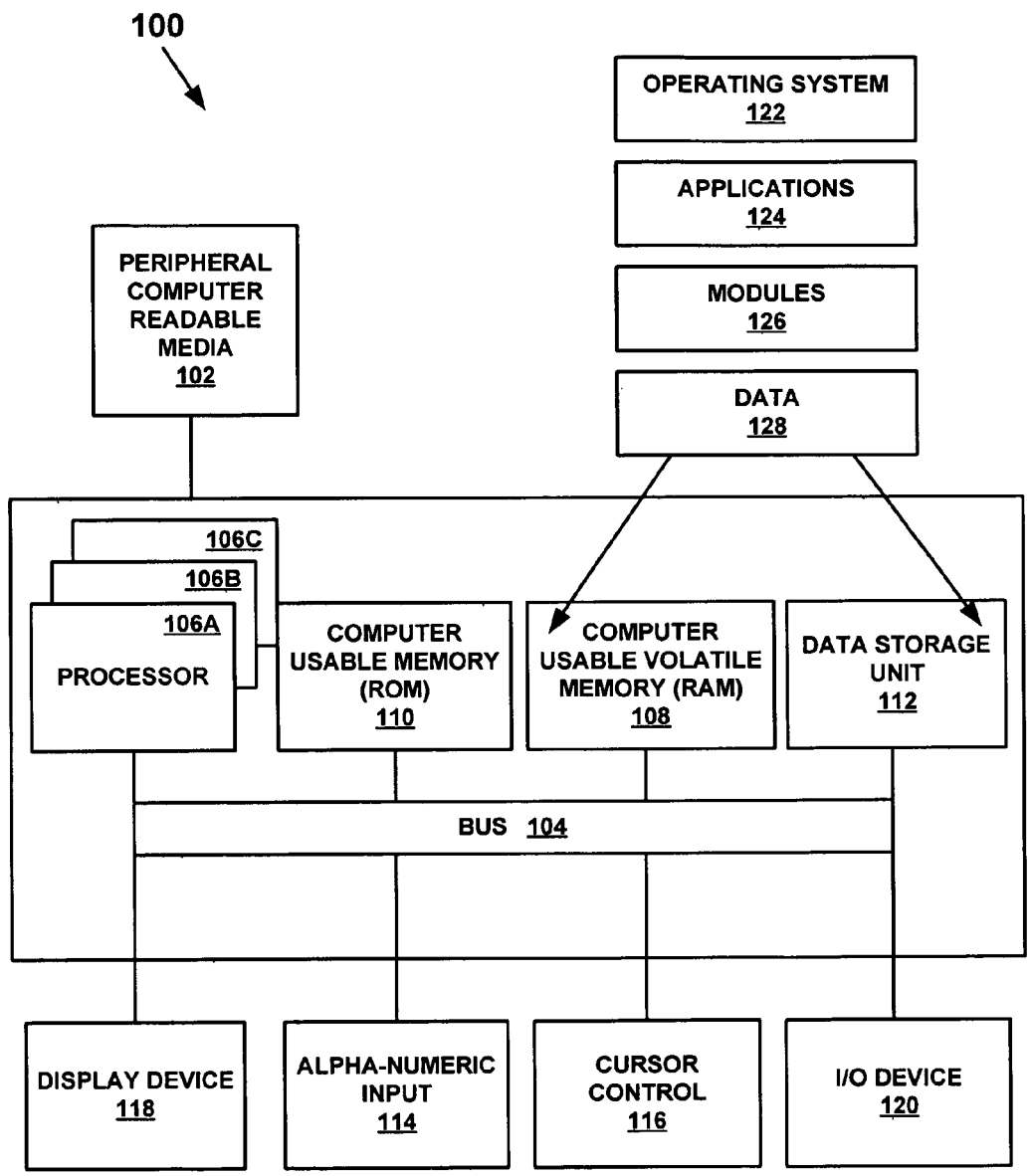
FIG. 1 is a diagram of an exemplary computer system used in accordance with embodiments of the present technology for dynamically modifying a theme-based media presentation.

With reference now to FIG. 1, portions of the technology for dynamically modifying a theme-based media presentation are composed of computer-readable and computer-executable instructions that reside, for example, in computer-usable media of a computer system. That is, FIG. 1 illustrates one example of a type of computer that can be used to implement embodiments, which are discussed below, of the present technology for dynamically modifying a theme-based media presentation.

FIG. 1 illustrates an exemplary computer system 100 used in accordance with embodiments of the present technology for dynamically modifying a theme-based media presentation. It is appreciated that system 100 of FIG. 1 is exemplary only and that the present technology for dynamically modifying a theme-based media presentation can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 16A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C.

System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. A more detailed discussion of the present technology for dynamically modifying a theme-based media presentation is found below.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for dynamically modifying a theme-based media presentation, for example, is stored as an application 124 or module 126 in memory locations within RAM 108 and memory areas within data storage unit 112.

Overview

Today, most digital memories (e.g., digital photos, movies, audio files, or any other multi-media files) have associated meta-data. One kind of meta-data is a time-stamp that can be added to an image by a digital camera, for example. In addition, other meta-data can include text annotation that can be added to an image either by a user or from another source such as a photo organization application. Some meta-data includes location, time, people, temperature, colors of the photo, etc. associated with various pictures and or movies. In one embodiment, as users add digital memories to their computer, they are prompted to "describe" the images so that metadata can be created for the photos. In another embodiment, as users show their photos, they are prompted to describe their photos.

Although it is appreciated that users can explicitly enter metadata, such as captions or ratings, it is also appreciated that metadata such as number of views, or number of times shared are examples of inferred or implied metadata that the user does not explicitly generate. In one embodiment, a "rating" of a photo can be determined by the number of times viewed, for example.

For simplicity, the terms "video," "movie," "image," "memory," "photo," "picture" include any type or kind of digital multi-media data files and it is appreciated that embodiments of the present technology for dynamically modifying a theme-based media presentation are well suited to be used with any multi-media files with associated meta-data.

As an overview, in one embodiment, the present technology for dynamically modifying a theme-based media presentation is directed towards a system for dynamically presenting multi-media, such as a digital picture frame or any other electronic and/or display device. For example, the system could determine that today is your wedding anniversary and adjust a media presentation (e.g., picture slide show, screen saver, digital picture frame, etc.) to focus on media (memories) captured at the wedding.

Depending on settings (e.g., user inputs or preferences), the memories presented could be exclusively from the wedding or could include other related memories (e.g., metadata tag=honeymoon or metadata tag=wedding). An appropriate theme could be chosen, optionally with a backing soundtrack (e.g., Hawaiian music if your honeymoon was in Hawaii).

In one embodiment, a rating (e.g., importance) is given to a particular memory (e.g., photo, movie or any other media). For example, as a user is importing pictures from a digital camera to their computer system, the user rates the picture on a scale of one to ten. Alternatively, the rating can be communal, such as how others have rated the photo on an on-line photo gallery, for example. In one embodiment, a combination of personal ratings and communal ratings are combined to form a hybrid rating which incorporates both ratings. In one embodiment, pictures with a higher rating are presented more often then photos with a lower rating. A user can also choose not to see a particular image. For example, during a slide show, a user might say "I don't want to see that photo again" and the photo would not be shown again. This can be accomplished in any number of ways, including a graphical user interface, voice recognition, etc.

General Description of the Technology

Many media organization applications allow users to add meta-data to multi-media data files. For example, when browsing a collection of photos, the application (e.g., wizard or graphical user interface) may prompt the user to "name the persons in the photo," "tell where the photo was taken," "what was the occasion," "rate the image," etc. These descriptions are then converted into meta-data tags that can then be used to organize the media and present the media in an organized or personalized way. Embodiments of the present technology for dynamically modifying a media presentation use the metadata associated with media to dynamically present media to a user. In one embodiment, the presentation is theme-based and dynamically changes according to inputs such as user theme preferences, the date, etc.

Figure 2:
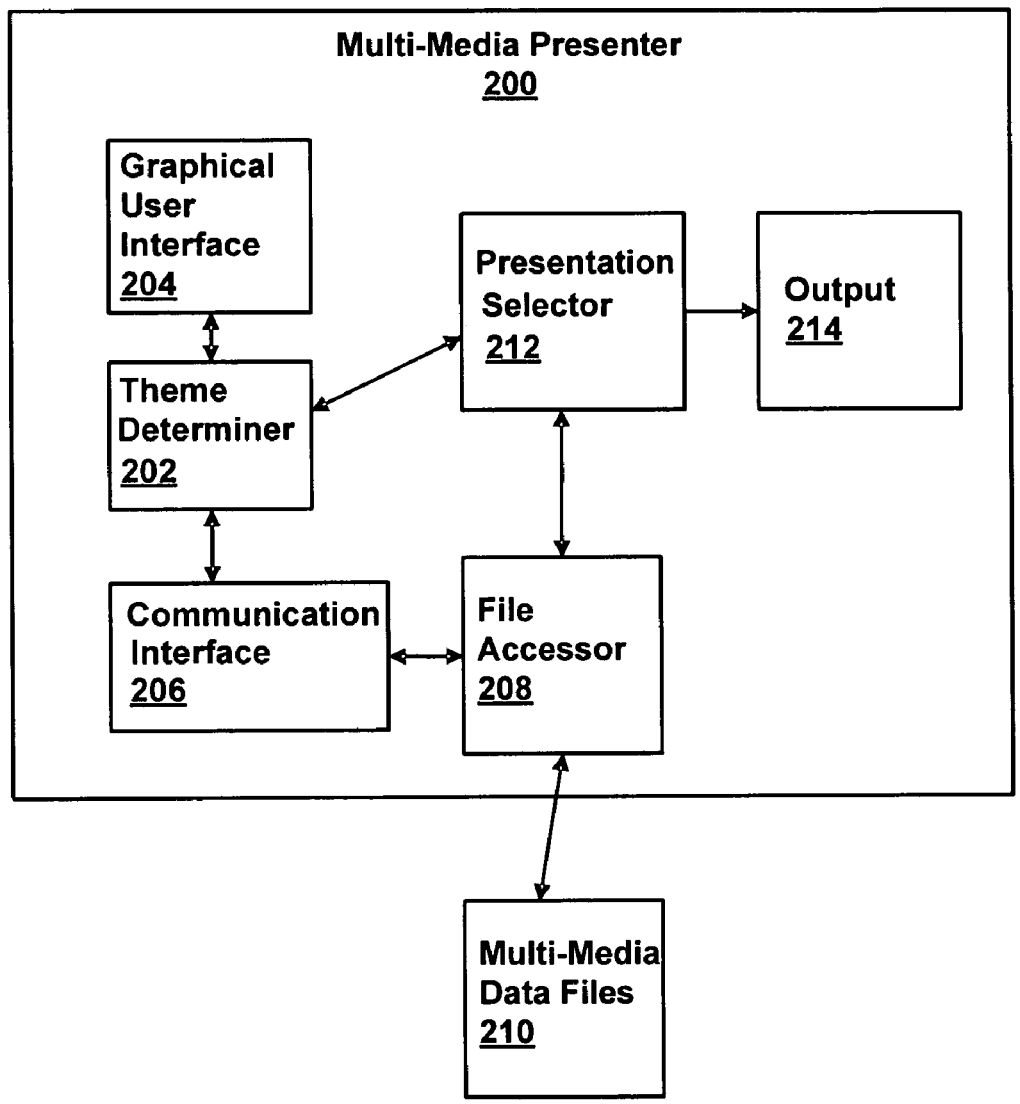
FIG. 2 is a block diagram of an exemplary system 200 used in accordance with embodiments of the present technology for dynamically modifying a theme-based media presentation.

With reference now to FIG. 2 a block diagram of an exemplary system 200 for dynamically modifying a theme-based multi-media presentation. Embodiments of the present technology for dynamically modifying a multi-media presentation can be used for automatically presenting multi-media on a computer, for example. The present technology is also well suited for use on a digital picture frame. For example, suppose it is a child's birthday (this information could be retrieved form an electronic calendar application). Embodiments of the present technology would realize that it is the child's birthday and in response, pictures of that child would be displayed. In one example, the photos can be presented in a progressively chronological order so a viewer would get a sense of the child growing up. Embodiments of the present technology can automatically detect a theme and select corresponding media based on that theme. The theme can also be dynamically modified according to many different inputs.

The multi-media presenter 200 of FIG. 2 includes access to a data store comprising a plurality of multi-media data files 210. It is appreciated that the multi-media data files can be stored in any number of locations, including locations remote to the multi-media presenter 200. For example, the multi-media data files 210 may be stored on a web-based photo gallery. It is appreciated that the multi-media data files can be stored in a combination of locations, including a removable memory (e.g., secure digital card) and an electronic device (e.g., digital camera or camera phone) coupled to the multi-media presenter 200.

The multi-media presenter 200 further includes a theme determiner 202 for determining a presentation theme. In one embodiment of the invention, the theme determiner automatically determines a theme based on user preferences and/or user information. For example, the theme determiner has access to an electronic calendar application and determines that today is your wedding anniversary. In response, the theme determiner automatically determines the theme should be "wedding anniversary." As a result, pictures of your wedding are displayed on your desktop. In one embodiment, the user preferences are based from the multi-media metadata.

In another embodiment, the theme determiner 202 is coupled to a graphical user interface 204 which allows a user to enter theme preferences. For example, a user may select through the graphical user interface that they want to see "vacation photos" and in response the theme determiner would determine the theme to be "vacation." In one embodiment, the user selects a combination of themes and allows the theme determiner to customize a theme based on the user preferences.

In another embodiment, the theme determiner 202 determines a theme based on information received from a source remote to the multi-media presenter 200. For example, the theme determiner could receive information from the Internet, for example. In this example, the theme determiner 202 receives information through the communication interface 206. It is appreciated that any number of methods for determining a theme can be used in accordance with the present technology for dynamically modifying a media presentation.

Once a theme is determined, a file accessor 208 accesses the multi-media data files 210. More particularly, the file accessor accesses the metadata associated with the multi-media data files. The metadata is searched for terms that match a query or set of queries and/or are related to a particular theme. For example, if the theme is "wedding anniversary," the metadata would be searched for terms associated with the user's "wedding." In one embodiment, a presentation selector 212 determines the media that corresponds to the theme determined by the theme determiner 202. It is appreciated that a plurality of images could be displayed simultaneously on a page, for example, two images per page or a collage of images. In this example, a single image could change at a time or the whole collage could change at a time, depending on user preferences. The multi-media is provided at output 214. Graphical borders (which could be theme based) could also be added to the displayed images.

Output 214 can be coupled to any number of devices or can be integrated within any number of devices including computer systems, set-top boxes, digital picture frames, cellular phones, media players, etc. Some of the devices could be remotely coupled to the output 214, e.g., over the Internet.

In one embodiment, the theme is dynamically modified (e.g., adapts) over time. For example, as a child's birthday approaches, more and more pictures of that child may appear as the birthday approaches. On the birthday, maybe only photos of that child are presented. In this example, the next event (e.g., birthday) causes the content to be weighted towards that event. This is considered to be time-relative content wherein the theme is related to an event that is about to happen or is about to happen.

Another example of a time-relative theme would be if a vacation were planned. As the date of departure nears, photos of the vacation destination could be displayed to get the user excited about the vacation. In this example, the images of the destination could be retrieved from the Internet, for example. The vacation travel information could be retrieved from an electronic calendar application or from any other source. User preferences that can be used to drive the dynamic modification of themes can be established in a graphical user interface as described below.

Figure 3:
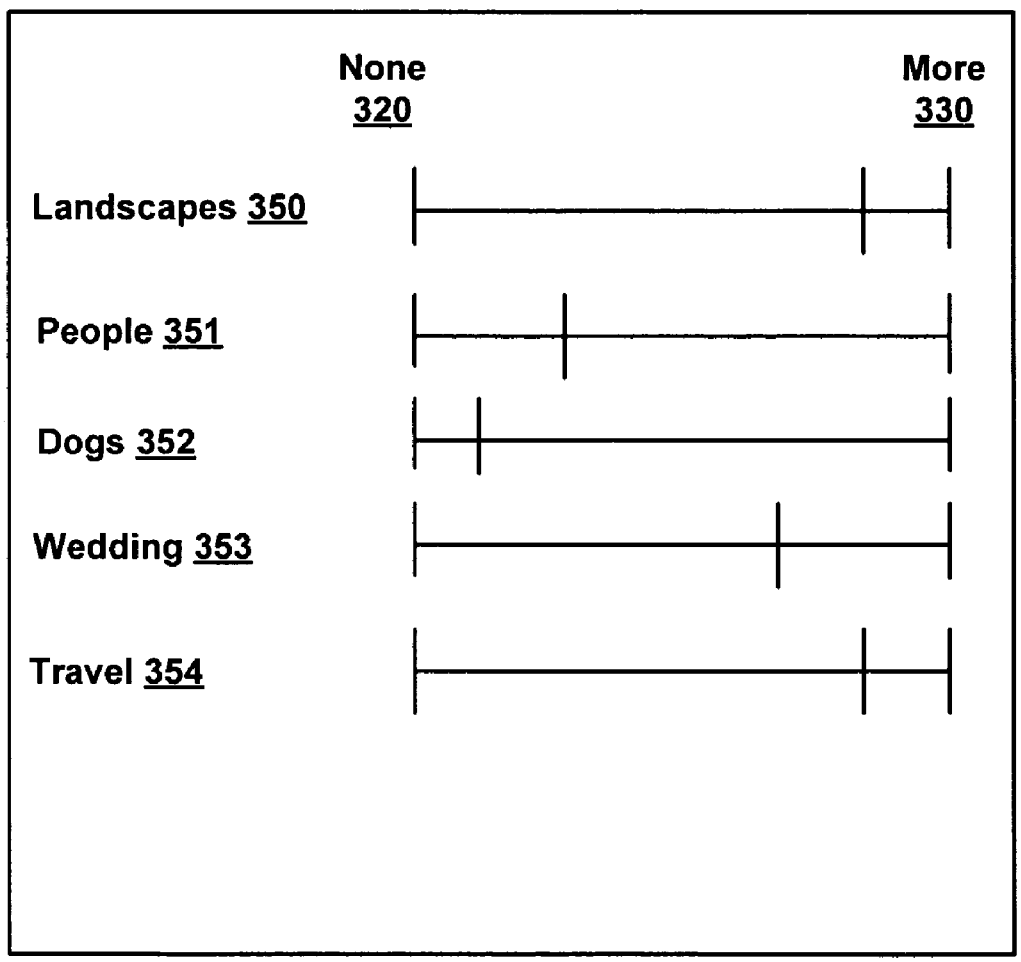
FIG. 3 is an illustration of an exemplary graphical user interface that can be used to determine theme preferences in accordance with the present technology for dynamically adjusting a multi-media presentation.

FIG. 3 is an illustration of an exemplary graphical user interface 204 that can be used to determine theme preferences in accordance with the present technology for dynamically adjusting a multi-media presentation. In one embodiment, the graphical user interface 204 can be used as a content filter to select a simple theme such as "wedding" or "first child." The graphical user interface could also be used to select a "combination" of themes. As illustrated in FIG. 3, the graphical user interface 204 includes the themes landscapes 350, people 351, dogs 352, wedding 353 and travel 354.

In one embodiment, the themes can be "rated" with a slider bar, for example. As shown in FIG. 3, the themes have an associated slider bar with one end for "none" 320 and the other end for "more" 330. In this example, a user could slide the bar to a desired location depending on how many pictures associated with the theme they want to see. In this example, the user wants to see more travel photos than photos with dogs.

In one embodiment, a user can create different "profiles" for themes. For example, a drop-down box 310 can be used to select different profiles such as a "work" profile. A user may not want to have personal photos shown on their screen saver at work. In this case, the user can choose to see "none" 320 of the photos with people 351 and choose "more" 330 of the photos with landscapes 350.

The user interface 204 can also be used to specify preferences for the content of a theme (e.g., which keywords apply "Wedding") or between themes ("Travel" vs. "Wedding"). Presentation choices can also be determined through the user interface 204. For example, a user can select between a "collage" presentation, "album" presentation, etc.

It is appreciated that themes can be selected by the user or may also be associated with events (e.g., birthdays, holidays, etc.) or content (e.g., baby's birth, sunsets, sporting events, etc.). In one embodiment of the present technology, the appropriate theme is dynamically selected based on relative priorities of the competing themes for any given set of media. Furthermore, the theme can transition from a first theme to a second theme based on any number of things, including adding or deleting multi-media data files.

In one embodiment, the tempo (e.g., how fast or slow the content changes) of a media presentation is considered. For example, the duration between content can be affected by theme, the content, or any other consideration. For example, a screensaver application may change more rapidly (e.g., have a faster tempo) than a digital picture frame on the wall.

Music can also be associated with a media presentation. The music can be associated with the theme or the content. For example, if the theme was heavily weighted by the user towards media with "landscapes," background music associated with nature could be played in conjunction with the photos. Or, in the case of a "Hawaiian honeymoon" theme, Hawaiian music can be played as background music. It is appreciated that the music could be accessed from data files (e.g., MP3s) or could be computer generated. Music could also be the ambient sounds/music that were captured at the time the images/movies were captured.

FIG. 4 is a flow diagram of an exemplary computer implemented method 400 for dynamically modifying a media presentation including presenting media associated with a theme.

At 402, method 400 includes determining a first presentation theme associated with a media presentation. In one embodiment, the theme is automatically determined. However, the theme can also be based on user preferences, information from applications, outside sources or any other source or combination of sources.

At 404, method 400 includes accessing a plurality of multi-media data files wherein each of the plurality of multi-media data files comprises associated metadata. In one embodiment, multi-media data files are stored in a plurality of locations and can be remote to the user.

At 406, method 400 includes associating a first of the multi-media data files with the first presentation theme based on the associated metadata tag. In one embodiment, media with a higher user rating is selected before and/or more often than media with a lower user rating.

At 408, method 400 includes presenting the first of the plurality of multi-media data files. In one embodiment, the media is presented according to a tempo associated with the first theme determined in 402. In another embodiment, the tempo is associated with and/or determined by the media presented.

In one embodiment, a second of the plurality of multi-media data files is associated with the first presentation theme and the second of the multi-media data files is presented. In one embodiment, the time between presenting the first and second multi-media data files (e.g., tempo) is determined by the theme or the content of the multi-media data files. The tempo could also be based on the metadata associated with the media.

The theme determined in 402 can be location-based. For example, in one embodiment, location information is available (e.g., GPS information, network information, etc.) and the location of the user can be determined. In this embodiment, the theme can be modified based on the location of the user. The theme could also be determined by user selected preferences or any other information.

It is appreciated that the multi-media data files accessed in 404 can be local or remote. For example, the multi-media data files could be accessed over the Internet from an on-line multi-media data store.

FIG. 5 is a data flow diagram of an exemplary computer implemented method 500 for dynamically modifying a multi-media presentation theme.

At 502, method 500 includes determining a first presentation theme associated with a multi-media presentation. In one embodiment, the theme is automatically determined. However, the theme can also be based on user preferences, information from applications, outside sources or any other source or combination of sources.

At 504, method 500 includes dynamically modifying the first presentation theme to a second presentation theme. In one embodiment of the invention, the first theme is modified to a second theme based on user selected theme preferences. The theme can be modified smoothly and seamlessly wherein the modification may or may not be perceived by a viewer. In another embodiment, the first theme is modified to a second theme based on other information associated with the user. For example, data associated with an electronic calendar application can be used to modify the first theme to the second theme.

At 506, method 500 includes accessing a plurality of multi-media data files wherein each of the plurality of multi-media data files comprises associated metadata.

At 508, method 500 includes associating a first of the multi-media data files with the second presentation theme based on the associated metadata.

At 510, method 500 includes presenting the first of the multi-media data files.

It is appreciated that embodiments of the present technology for dynamically modifying a media presentation can be used beyond selecting photos for a slide show. For example, the present technology can be used to select a movie title, for example. A user could enter their movie preferences (e.g., movie mood) and the appropriate movie would be selected. For example, a person may enter that they want a "comedy," "from the last five years," "rated PG-13" and the appropriate movie selection(s) would be provided without the user knowing exactly what movie they wanted. The same could be used to select a music title. Embodiments of the present technology interpret a user's theme preferences to provide media in a dynamic way to the user.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for dynamically modifying a media presentation comprising:
   executing, by a computer system comprising at least one processor, a multi-media presenter application for presenting multi-media associated with a first presentation theme in said media presentation;
   automatically determining a second presentation theme associated with said media presentation by:
   said multi-media presenter application accessing an electronic calendar application,
   said multi-media presenter application retrieving information for an event from said electronic calendar application, and
   said multi-media presenter application dynamically selecting said second presentation theme associated with said media presentation based on said information for said event retrieved from said electronic calendar application;
   dynamically modifying, by said multi-media presenter application, said first presentation theme to said second presentation theme;
   accessing, by said multi-media presenter application, a plurality of multi-media data files, wherein each of said plurality of multi-media data files comprises associated metadata;
   searching, by said multi-media presenter application, said associated metadata for terms related to said second presentation theme that match a query or set of queries;
   associating, by said multi-media presenter application, a first of said plurality of multi-media data files with said second presentation theme based on said associated metadata;
   presenting, by said multi-media presenter application, said first of said plurality of multi-media data files to a display;
   associating, by said multi-media presenter application, a second of said plurality of multi-media data files with said second presentation theme based on said associated metadata; and
   presenting, by said multi-media presenter application, said second of said plurality of multi-media data files to said display.

2. The computer-implemented method of claim 1 wherein said second presentation theme is accessed by said computer system locally, remotely, from a network, or over the Internet.

3. The computer-implemented method of claim 1 further comprising:
   receiving user inputs associated with said second presentation theme; and
   modifying said second presentation theme based on said user inputs.

4. The computer-implemented method of claim 3 wherein said second presentation theme is modified by said user through an adjustable graphical user interface.

5. The computer-implemented method of claim 1 wherein said multi-media data files are accessed by said computer system locally, remotely, over a network, or over the Internet.

6. The computer-implemented method of claim 1 further comprising:
   determining, by said multi-media presenter application, a presentation tempo associated with said second presentation theme.

7. The computer-implemented method of claim 1 wherein said event comprises at least one of an anniversary, a birthday, a holiday, and a vacation in said electronic calendar application.

8. A computer-usable storage medium storing computer-readable instructions that when executed cause a computer system to perform a computer-implemented method for dynamically modifying a media presentation, said computer-implemented method comprising:
   presenting, by a multi-media presenter application, multi-media associated with a first presentation theme in said media presentation;
   automatically determining a second presentation theme associated with said media presentation by:
   said multi-media presenter application accessing an electronic calendar application,
   said multi-media presenter application retrieving information for an event from said electronic calendar application, and
   said multi-media presenter application dynamically selecting said second presentation theme for said media presentation based on said information for said event retrieved from said electronic calendar application;
   dynamically modifying said first presentation theme to said second presentation theme;
   accessing a plurality of multi-media data files, wherein each of said plurality of multi-media data files comprises associated metadata;
   searching said associated metadata for terms related to said second presentation theme that match a query or set of queries;
   associating a first of said plurality of multi-media data files with said second presentation theme based on said associated metadata;
   presenting said first of said plurality of multi-media data files to a display;
   associating a second of said plurality of multi-media data files with said second presentation theme based on said associated metadata; and
   presenting, by said multi-media presenter application, said second of said plurality of multi-media data files to said display.

9. The computer-usable storage medium of claim 8 wherein said second presentation theme is accessed by said computer system locally, remotely, from a network, or over the Internet.

10. The computer-usable storage medium of claim 8 further comprising computer-readable instructions for:
    receiving user inputs associated with said second presentation theme; and
    modifying said second presentation theme based on said user inputs.

11. The computer-usable storage medium of claim 10 wherein said user inputs associated with said second presentation theme are received from a user through an adjustable graphical user interface.

12. The computer-usable storage medium of claim 8 wherein said multi-media data files are accessed by said computer system locally, remotely, over a network, or over the Internet.

13. The computer-usable storage medium of claim 8 wherein said event comprises at least one of an anniversary, a birthday, a holiday, and a vacation in said electronic calendar application.

14. A system for dynamically modifying a media presentation, the system comprising:
   one or more processors;
   one or more computer-usable storage media storing computer-readable instructions executed by the one or more processors to perform steps comprising:
   presenting, by a multi-media presenter application, multi-media associated with a first presentation theme in said media presentation;
   automatically determining a second presentation theme associated with said media presentation by:
      said multi-media presenter application accessing an electronic calendar application,
      said multi-media presenter application retrieving information for an event from said electronic calendar application, and
      said multi-media presenter application dynamically selecting said second presentation theme for said media presentation based on said information for said event retrieved from said electronic calendar application;
   dynamically modifying said first presentation theme to said second presentation theme,
   accessing a plurality of multi-media data files, wherein each of said plurality of multi-media data files comprises associated metadata;
   searching said associated metadata for terms related to said second presentation theme that match a query or set of queries;
   associating a first of said plurality of multi-media data files with said second presentation theme based on said associated metadata;
   presenting said first of said plurality of multi-media data files to a display;
   associating a second of said plurality of multi-media data files with said second presentation theme based on said associated metadata; and
   presenting, by said multi-media presenter application, said second of said plurality of multi-media data files to said display.

15. The system of claim 14 wherein said second presentation theme is accessed by the one or more processors locally, remotely, from a network, or over the Internet.

16. The system of claim 14 wherein the steps further comprise:
   presenting a graphical user interface for adjusting theme preferences associated with a user.

17. The system of claim 16 wherein said second presentation theme that is automatically determined by the one or more processors can be adjusted by user inputs to said graphical user interface.

18. The system of claim 14 wherein said multi-media data files are accessed by the one or more processors locally, remotely, over a network, or over the Internet.

19. The system of claim 14 wherein first of said plurality of multi-media data files and said second of said plurality of multi-media data files are presented on a display device or electronic picture frame coupled to said system.

20. The system of claim 14 wherein said event comprises at least one of an anniversary, a birthday, a holiday, and a vacation in said electronic calendar application.

* * * * *